United States Patent
Chriki et al.

(10) Patent No.: US 12,216,284 B2
(45) Date of Patent: Feb. 4, 2025

(54) OPTICAL SYSTEM WITH COMPACT COUPLING FROM A PROJECTOR INTO A WAVEGUIDE

(71) Applicant: Lumus Ltd., Ness Ziona (IL)

(72) Inventors: Ronen Chriki, Lod (IL); Tsion Eisenfeld, Ashkelon (IL); Elad Sharlin, Mishmar David (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 18/390,074

(22) Filed: Dec. 20, 2023

(65) Prior Publication Data
US 2024/0126085 A1     Apr. 18, 2024

Related U.S. Application Data

(63) Continuation of application No. 18/039,260, filed as application No. PCT/IL2022/050226 on Mar. 1, 2022.

(60) Provisional application No. 63/154,870, filed on Mar. 1, 2021.

(51) Int. Cl.
    *G02B 27/01*     (2006.01)
    *G02B 27/28*     (2006.01)

(52) U.S. Cl.
    CPC ........ *G02B 27/0172* (2013.01); *G02B 27/283* (2013.01)

(58) Field of Classification Search
    CPC .............. G02B 27/0172; G02B 27/283; G02B 27/0081; G02B 27/286; G02B 2027/0125; G02B 2027/0178; G02B 5/04
    See application file for complete search history.

(56) References Cited

U.S. PATENT DOCUMENTS

| | | | |
|---|---|---|---|
| 8,098,439 B2 | 1/2012 | Amitai et al. | |
| 10,996,475 B2 | 5/2021 | Wu | |
| 11,448,816 B2 * | 9/2022 | Danziger | G02B 6/0051 |
| 11,644,676 B2 * | 5/2023 | Grabarnik | G02B 6/0026 |
| | | | 359/630 |
| 11,686,939 B2 * | 6/2023 | Danziger | G02B 6/10 |
| | | | 359/630 |
| 11,714,224 B2 * | 8/2023 | Danziger | G02B 6/0055 |
| | | | 362/606 |
| 11,860,369 B2 * | 1/2024 | Chriki | G02B 5/04 |
| 11,914,187 B2 * | 2/2024 | Ronen | G02B 6/10 |

(Continued)

FOREIGN PATENT DOCUMENTS

CN     108107576 A     6/2018

*Primary Examiner* — Andrew Jordan
(74) *Attorney, Agent, or Firm* — Rivka Friedman

(57) ABSTRACT

An optical system includes a light-guide optical element (LOE) (10) having mutually-parallel first and second major external surfaces (11, 12) for guiding light by internal reflection, and a projector (100) that projects illumination corresponding to a collimated image from an aperture (101). The projector injects light in to the LOE via a coupling prism (30) attached to the first major external surface (11) that projects an image injection surface. A reflective polarizing beam splitter (51) is deployed at an interface between the major external surface (11) and the coupling prism (30) parallel to the major external surfaces, to selectively transmit illumination from the coupling prism into the LOE while trapping light already within the LOE so as to propagate within the LOE by internal reflection.

9 Claims, 8 Drawing Sheets

(56) References Cited

U.S. PATENT DOCUMENTS

| | | | |
|---|---|---|---|
| 12,099,197 B2* | 9/2024 | Amitai | G02B 27/0081 |
| 2005/0174658 A1 | 8/2005 | Long et al. | |
| 2005/0180687 A1 | 8/2005 | Amitai | |
| 2007/0002191 A1 | 1/2007 | Hashizume et al. | |
| 2010/0048085 A1 | 2/2010 | Kayanuma et al. | |
| 2010/0111472 A1 | 5/2010 | DeJong | |
| 2013/0250431 A1 | 9/2013 | Robbins et al. | |
| 2015/0131059 A1 | 5/2015 | Fischer et al. | |
| 2015/0247976 A1 | 9/2015 | Abovitz et al. | |
| 2016/0116739 A1 | 4/2016 | TeKolste et al. | |
| 2017/0028548 A1 | 2/2017 | Nagano | |
| 2017/0285346 A1 | 10/2017 | Pan | |
| 2017/0299860 A1 | 10/2017 | Wall et al. | |
| 2017/0315346 A1 | 11/2017 | Tervo et al. | |
| 2018/0143509 A1 | 5/2018 | Oh | |
| 2018/0157057 A1* | 6/2018 | Gelberg | G02B 27/283 |
| 2018/0210202 A1 | 7/2018 | Danziger | |
| 2018/0267312 A1 | 9/2018 | Melli | |
| 2019/0056593 A1 | 2/2019 | Bablumyan | |
| 2019/0064518 A1 | 2/2019 | Danziger | |
| 2019/0227317 A1 | 7/2019 | Trail et al. | |
| 2019/0361240 A1 | 11/2019 | Gelberg | |
| 2020/0209667 A1* | 7/2020 | Sharlin | G02B 6/0035 |
| 2020/0278558 A1 | 9/2020 | Yamamoto et al. | |
| 2021/0239898 A1* | 8/2021 | Danziger | G02B 6/0028 |
| 2022/0057643 A1* | 2/2022 | Eisenfeld | G02B 27/14 |
| 2022/0082838 A1* | 3/2022 | Grabarnik | G02B 6/0026 |
| 2022/0099885 A1* | 3/2022 | Ronen | G02B 6/10 |
| 2022/0107499 A1 | 4/2022 | Amitai | |
| 2022/0155629 A1* | 5/2022 | Sharlin | G02B 27/0172 |
| 2022/0334391 A1* | 10/2022 | Danziger | G02B 5/30 |
| 2023/0013376 A1* | 1/2023 | Danziger | G02B 6/0055 |
| 2023/0296968 A1* | 9/2023 | Danziger | G03B 21/142 353/122 |
| 2023/0350204 A1* | 11/2023 | Chriki | G02B 27/286 |
| 2023/0359034 A1* | 11/2023 | Ronen | G02B 27/0172 |
| 2024/0126085 A1* | 4/2024 | Chriki | G02B 27/0081 |

* cited by examiner

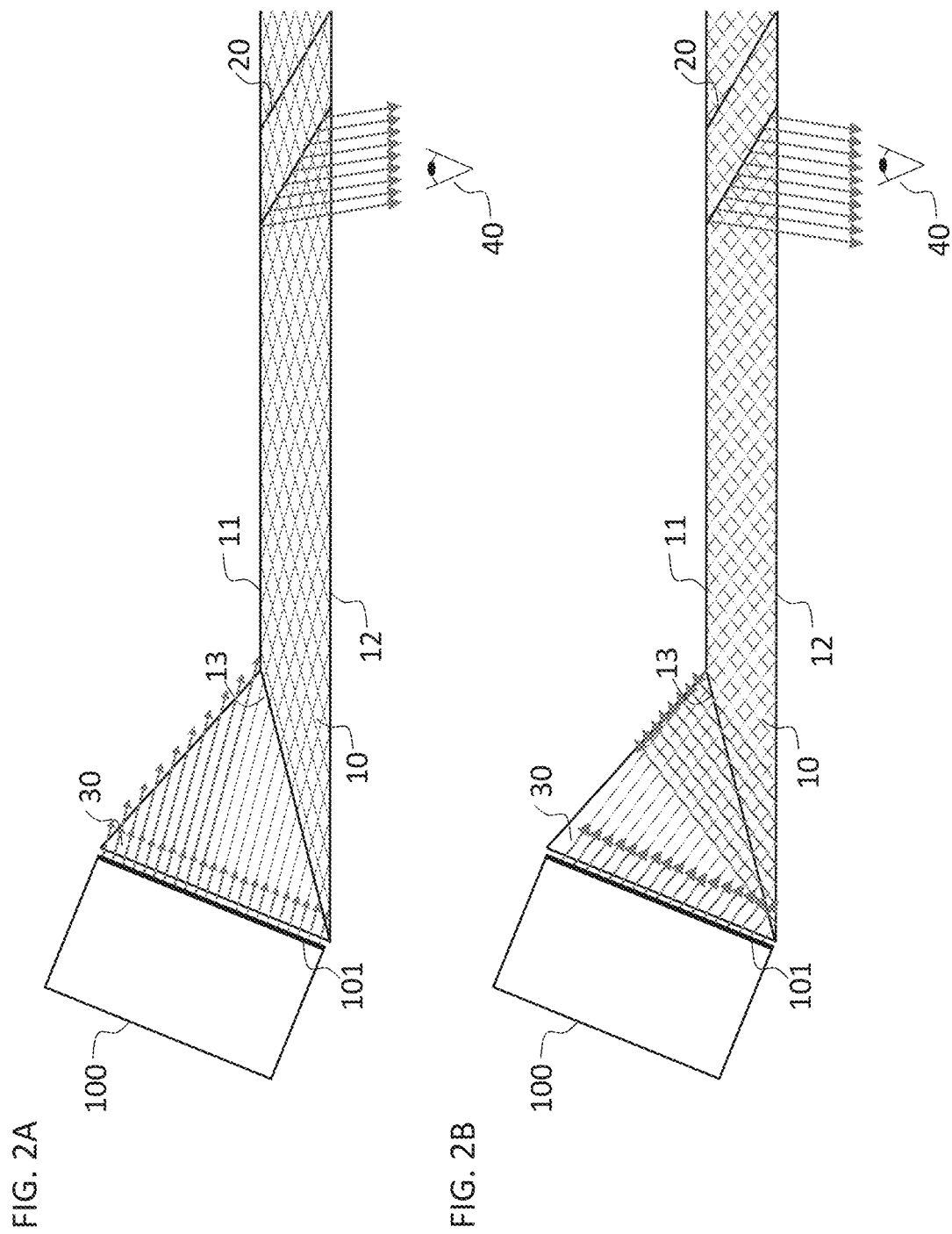

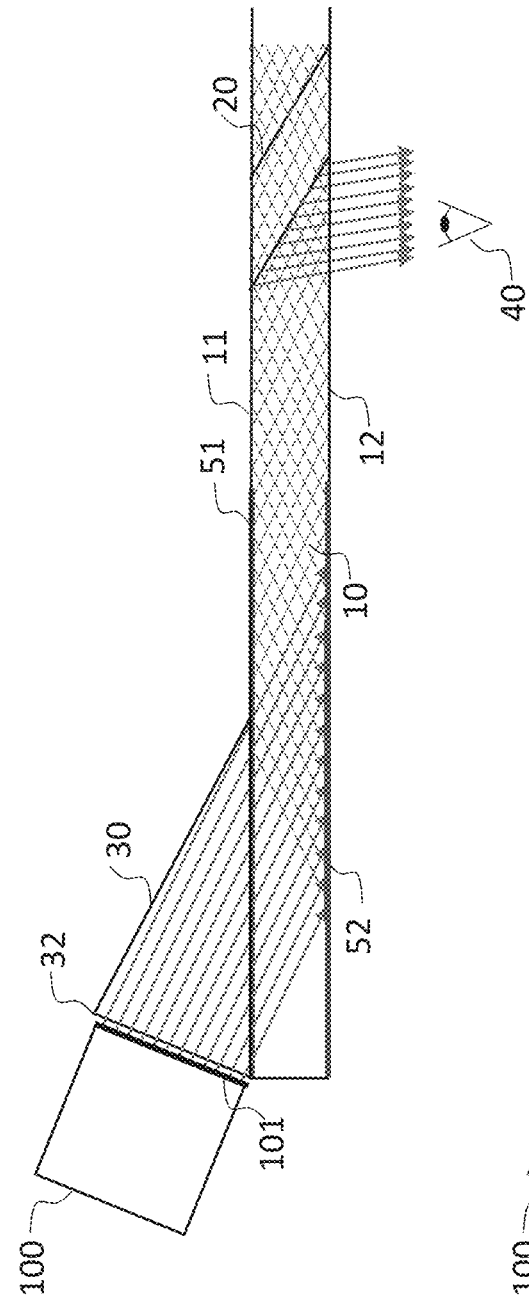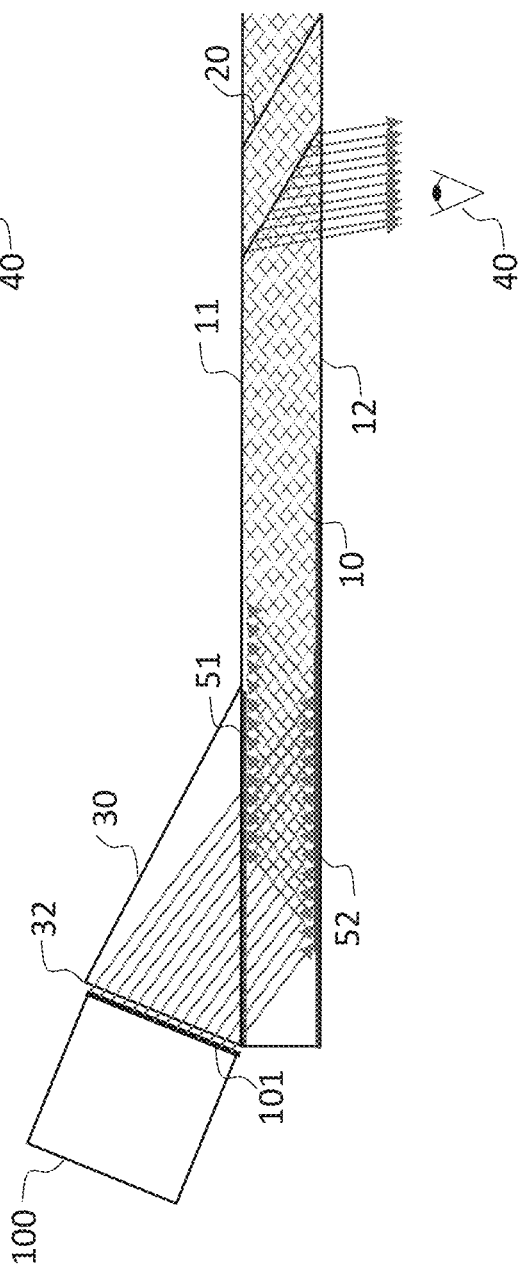

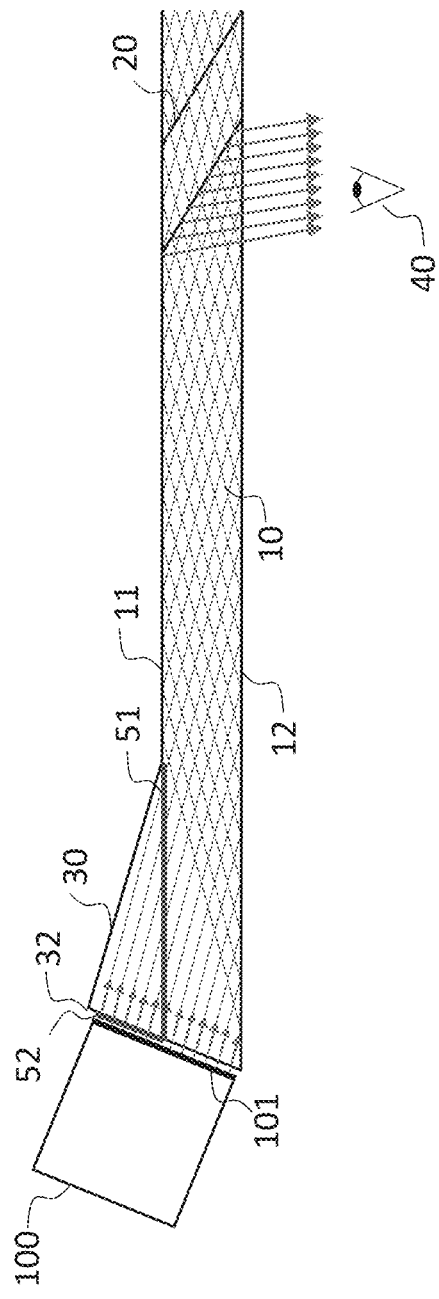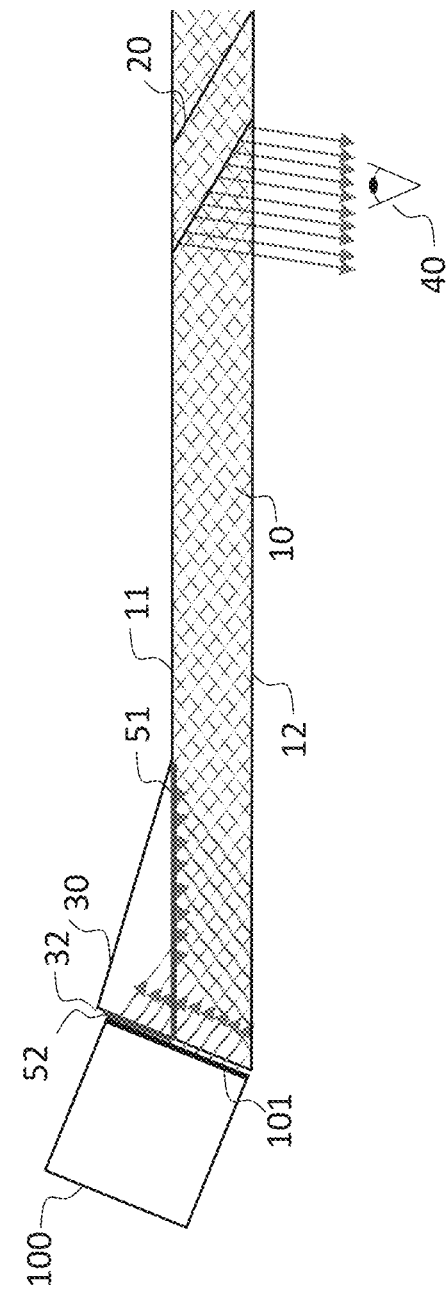

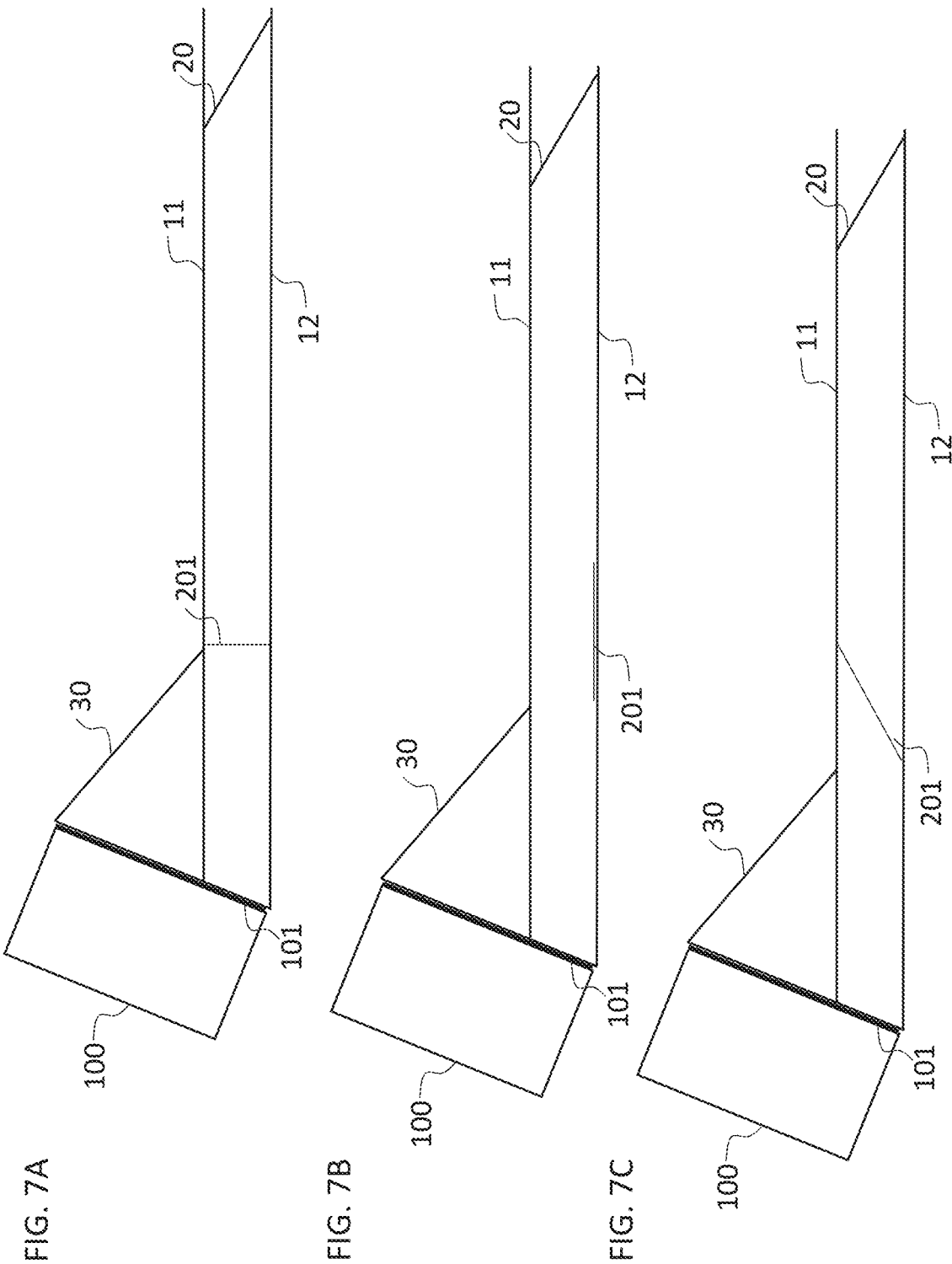

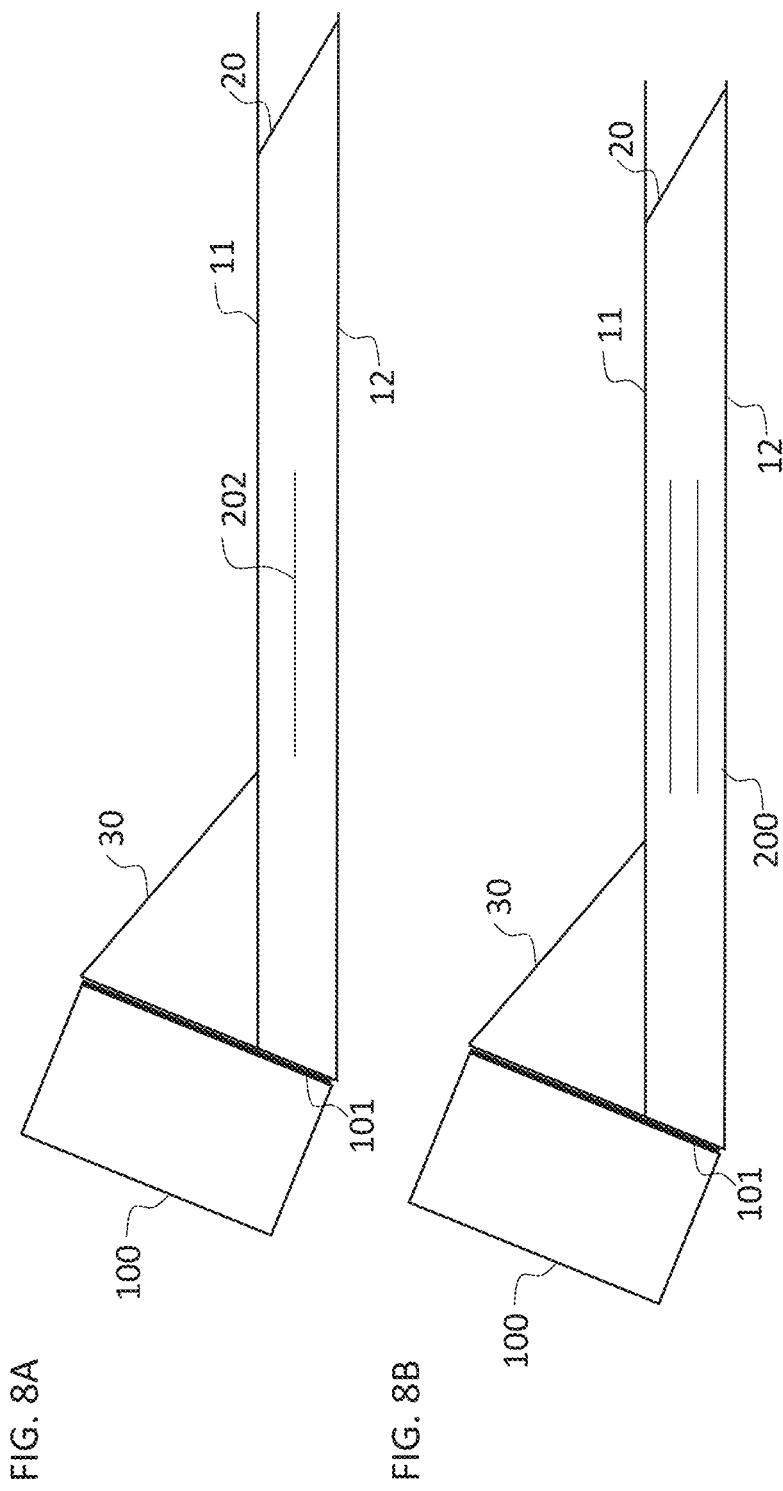

OPTICAL SYSTEM WITH COMPACT COUPLING FROM A PROJECTOR INTO A WAVEGUIDE

FIELD AND BACKGROUND OF THE INVENTION

The present invention relates to optical systems and, in particular, it concerns an optical system with compact coupling of an image from a projector into a waveguide.

Many virtual reality and augmented reality displays employ a light-guide optical element (LOE) with two major parallel planar surfaces within which an image propagates by internal reflection. Illumination corresponding to a collimated image is generated by a projector, and is introduced into the LOE at a coupling-in region. The illumination propagates within the LOE by internal reflection until reaching a coupling-out region where it is coupled out of the LOE towards the viewer's eye. Coupling out of the illumination toward the eye may be by use of a set of obliquely angled partially reflective internal surfaces, or by use of one or more diffractive optical element, all as well-known in the art. Coupling of the image illumination from the projector into the LOE may be achieved via a coupling prism.

SUMMARY OF THE INVENTION

The present invention is an optical system with compact coupling of an image from a projector into a waveguide.

According to the teachings of an embodiment of the present invention there is provided, an optical system comprising: (a) a light-guide optical element (LOE) formed from transparent material and having mutually-parallel first and second major external surfaces for guiding light by internal reflection; (b) a projector configured to project illumination corresponding to a collimated image from an aperture, the illumination exiting the aperture with a chief ray defining an optical axis of the projector and with an angular field about the chief ray; (c) a coupling prism attached to the first major external surface of the LOE, the coupling prism providing at least part of an image injection surface angled obliquely to the major external surfaces, the projector being associated with the image injection surface and oriented such that the chief ray and the angular field about the chief ray are injected through the image injection surface at angles of incidence relative to the major external surfaces greater than a critical angle for internal reflection at the major external surfaces; and (d) a reflective polarizing beam splitter deployed at an interface between the major external surface and the coupling prism parallel to the major external surfaces, at least part of the illumination being incident on the beam splitter with a first polarization and being transmitted by the beam splitter from the coupling prism into the LOE, light corresponding to a conjugate image of the collimated image and having a second polarization incident on the beam splitter from within the LOE being reflected from the beam splitter so as to propagate within the LOE by internal reflection.

According to a further feature of an embodiment of the present invention, there is also provided a waveplate deployed in a path of at least a part of the illumination to convert the illumination between the first polarization and the second polarization.

According to a further feature of an embodiment of the present invention, the waveplate is a quarter-wave plate associated with at least part of the second major external surface of the LOE.

According to a further feature of an embodiment of the present invention, the waveplate is a half-wave plate deployed in overlapping relation to a first part of the aperture without overlapping a second part of the aperture.

According to a further feature of an embodiment of the present invention, the first part of the aperture projects illumination through a part of the image injection surface from which light passes into the LOE without traversing the beam splitter.

According to a further feature of an embodiment of the present invention, the projector is configured to project illumination of the second polarization, wherein the first part of the aperture projects illumination through a part of the image injection surface from which light passes through the beam splitter, the half-wave plate converting illumination of the second polarization into illumination of the first polarization.

According to a further feature of an embodiment of the present invention, the image injection surface is provided in part by the coupling prism and in part by a surface of the LOE.

According to a further feature of an embodiment of the present invention, the image injection surface is provided entirely by the coupling prism.

BRIEF DESCRIPTION OF THE DRAWINGS

The invention is herein described, by way of example only, with reference to the accompanying drawings, wherein:

FIGS. 2A and 2B are schematic side views of a projector injecting an image into a waveguide via a coupling prism so as to fill the thickness of the waveguide with the image, illustrating a shallow extremity of the projected angular field and a steepest extremity of the projected angular field, respectively;

FIGS. 5A and 5B are schematic side views of an optical system according to a variant embodiment of the present invention, illustrating a shallow extremity, and a steepest extremity of the projected angular field, respectively;

FIGS. 6A and 6B are schematic side views of an optical system according to a further variant embodiment of the present invention, illustrating a shallow extremity, and a steepest extremity of the projected angular field, respectively;

FIGS. 7A-7C are schematic side views of an optical system according to any of the above embodiments, illustrating possible deployments of a retarder element to reduce polarization-related banding effects; and FIGS. 8A and 8B are schematic side views of an optical system according to any of the above embodiments, illustrating possible deployments of one or two internal partialreflectors, respectively, to achieve mixing to reduce polarization-related banding effects.

DESCRIPTION OF THE PREFERRED EMBODIMENTS

The present invention is an optical system with compact coupling of an image from a projector into a waveguide.

The principles and operation of optical systems according to the present invention may be better understood with reference to the drawings and the accompanying description.

Figure 1:
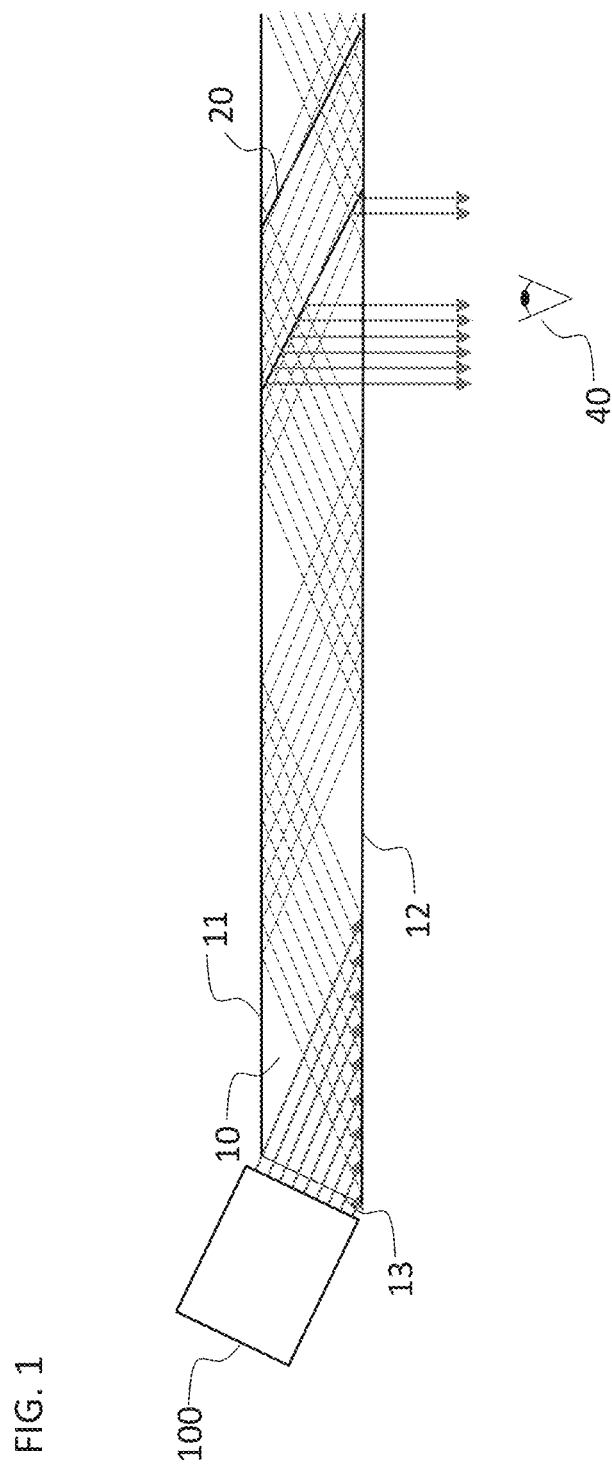
FIG. 1 is a schematic side view of a projector injecting an image into a waveguide via an edge surface, indicating incomplete filling of the waveguide with the image.

By way of introduction, FIG. 1 shows rays propagating inside a light-guide optical element (LOE) 10 (referred to herein interchangeably as a "waveguide") by internal reflection at mutually-parallel first and second major external surfaces 11 and 12. In this example, the rays are coupled out towards an eye 40 of an observer by embedded partially reflective mirrors 20, that are obliquely angled to the major external surfaces of the LOE. The invention is equally applicable to displays employing diffractive optical elements for coupling-out image illumination towards the eye of the observer, as is well-known in the art.

Illumination from a projector 100 corresponding to a collimated image is here shown injected into the waveguide at surface 13 in a simple manner that does not duplicate the injected image, and therefore a conjugated image is not generated. As a result, the rays propagating inside the waveguide contain 'holes', i.e., regions which the image illumination does not reach, and the rays reaching the observer's eye 40 are not uniform. The intensity distribution detected by the observer is therefore not uniform, and would change with different positions of the eye within an "eye motion box" (permissible viewing positions of the eye), and would depend on the specific field being observed.

In order to achieve uniform illumination of the outcoupled light, more advanced coupling-in configurations are often used, such as the one presented in FIGS. 2A and 2B. Here a projector 100 provides a larger aperture and is coupled to the LOE via a prism 30 so that rays injected into the waveguide and reflected by the lower surface of the waveguide 12 overlap rays that are injected directly from the projector. This assures that both the image and its conjugate are fully present inside the waveguide, referred to as "filling" the waveguide with the image illumination. Of course, this must be true for all fields supported by the waveguide. FIGS. 2A and 2B show the two extreme cases of a typical field of view, of about 20° wide inside the media, corresponding to about 30° wide in air. It will be noted that a significant proportion of the illumination for each field is lost (represented by ray directions which terminate at the back surface of the coupling prism rather than entering the LOE, due to falling outside the LOE aperture).

In principle, advanced projectors could be designed such that each field would be comprised only of rays that would eventually be coupled into the waveguide. However, these are difficult to design and suggest many technical complications (for instance, the apertures in such a system are at oblique angles to the chief ray, and are far from the projector, typically requiring a large projector). Furthermore, a projector of this type would have to be designed for a specific waveguide, and generic projectors of 'one fits all' are not possible.

Figure 3A:
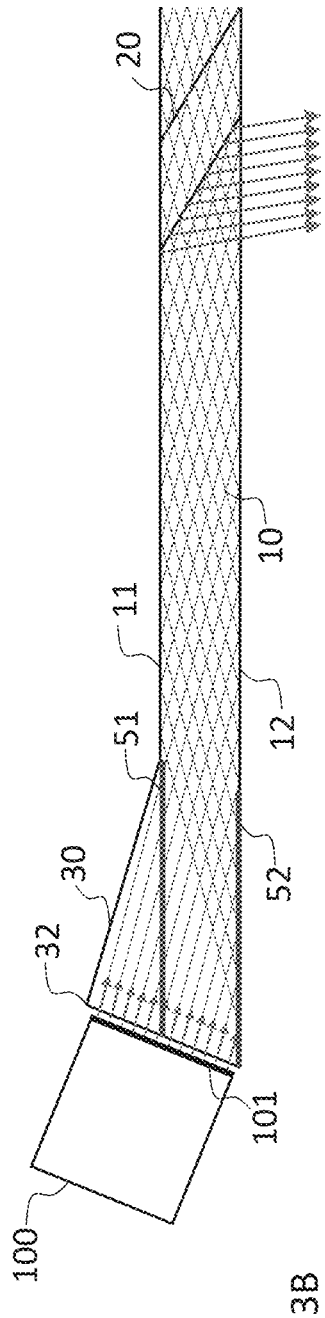
FIGS. 3A-3C are schematic side views of an optical system according to an embodiment of the present invention including a projector injecting an image into a waveguide via a coupling prism with a reflective polarizing beam splitter, illustrating a shallow extremity, a middle-field, and a steepest extremity of the projected angular field, respectively.
Figure 3B:
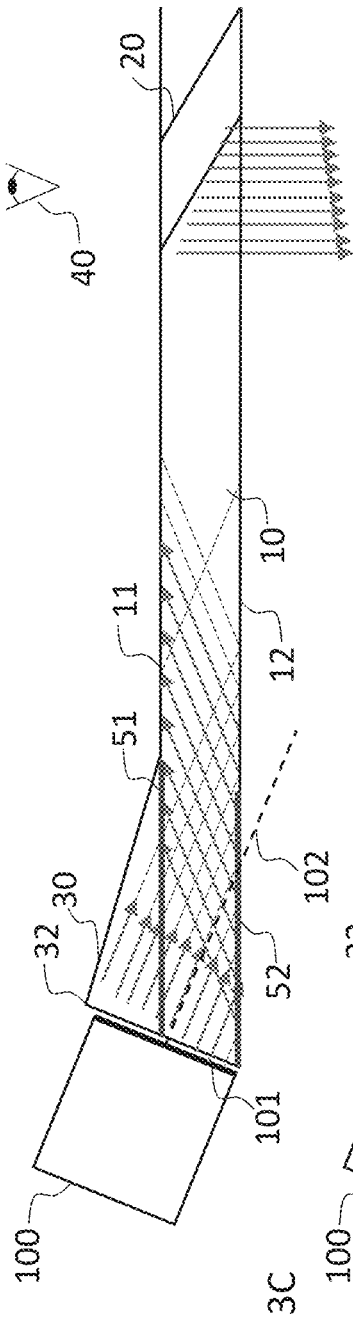
Figure 3C:
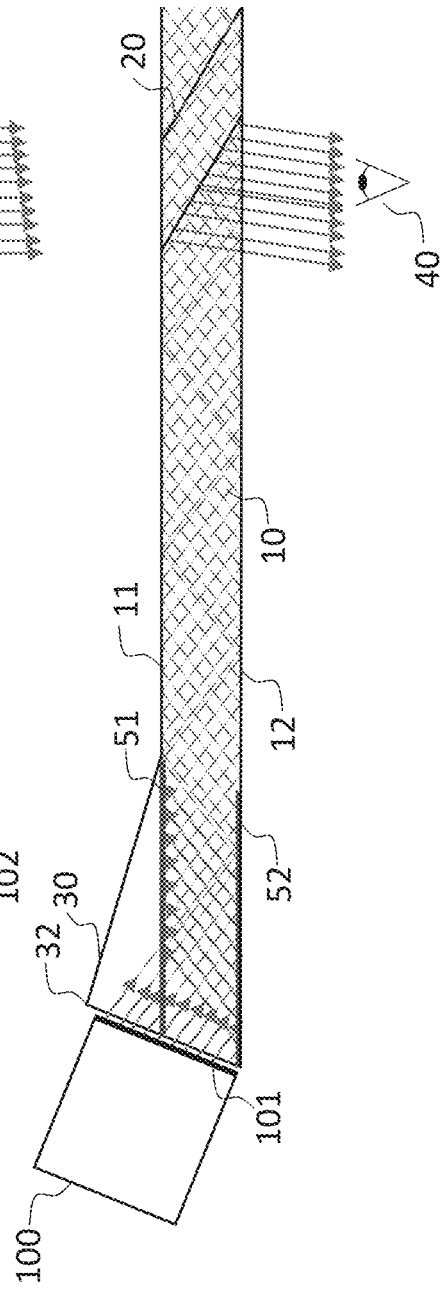

Referring now generically to certain particularly preferred implementations of the present invention, there is provided an optical system including a light-guide optical element (LOE) 10 formed from transparent material and having mutually-parallel first and second major external surfaces 11, 12 for guiding light by internal reflection. A projector 100 is configured to project illumination corresponding to a collimated image from an aperture 101, the illumination exiting the aperture with a chief ray defining an optical axis 102 of the projector and with an angular field about the chief ray. FIG. 3B illustrates a set of rays parallel to the chief ray, while FIGS. 3A and 3C illustrate the shallowest-angle and steepest-angle rays of the angular field, respectively.

A coupling prism 30, attached to first major external surface 11 of the LOE, provides at least part of an image injection surface 32 angled obliquely to the major external surfaces 11 and 12. In the non-limiting example of FIGS. 3A-3C, image injection surface 32 is provided in part by coupling prism 30 and in part by an edge of LOE 10, polished together to form a continuous surface. Projector 100 is associated with image injection surface 32 and oriented such that the chief ray and the angular field about the chief ray are injected through the image injection surface at angles of incidence relative to the major external surfaces that are greater than a critical angle for internal reflection at the major external surfaces. In other words, the orientation of the projector and coupling prism are such that the image illumination can propagate within the LOE by internal reflection at the angles at which they were projected.

It is a particular feature of certain preferred implementations of the present invention that a reflective polarizing beam splitter 51 is deployed at an interface between the first major external surface 11 and the coupling prism 30, parallel to the major external surfaces. At least part of the illumination from projector 100 is incident on beam splitter 51 with a first polarization that is transmitted by the beam splitter from coupling prism 30 into LOE 10, while light corresponding to a conjugate image of the collimated image and having a second polarization is incident on the beam splitter from within the LOE and is reflected from the beam splitter so as to propagate within the LOE by internal reflection. The beam splitter thus differentiates between image illumination from projector 100, which is allowed to enter the LOE, and image illumination already within the LOE, which is prevented from escaping, and begins its propagation via internal reflection along the LOE.

Various arrangements can be used to effect the polarization conditioning which achieves the aforementioned functionality. In a particularly preferred subset of examples, a waveplate is deployed in a path of at least a part of the image illumination to convert the illumination between the first polarization and the second polarization. FIGS. 3A-3C illustrate one example of this, in which the waveplate is implemented as a quarter-wave plate 52 associated with at least part of the second major external surface 12 of the LOE.

Operation of this implementation is as follows. Light is projected from the projector 100 into the waveguide 10 p-polarized. (The option of employing p-polarized projected illumination is chosen arbitrarily for this example, but it should be understood that this example could equally be presented with projection of s-polarized illumination, and the p/s polarization designations interchanged throughout.) Reflective polarizing beam splitter 51 that (in this example) transmits p-polarized light and reflects s-polarized light is deployed between coupling prism 30 and upper surface 11. Optical retarder (quarter-wave plate) 52 is placed on at least part of lower surface 12 and acts to change the polarization of the incident rays.

Figure 4:
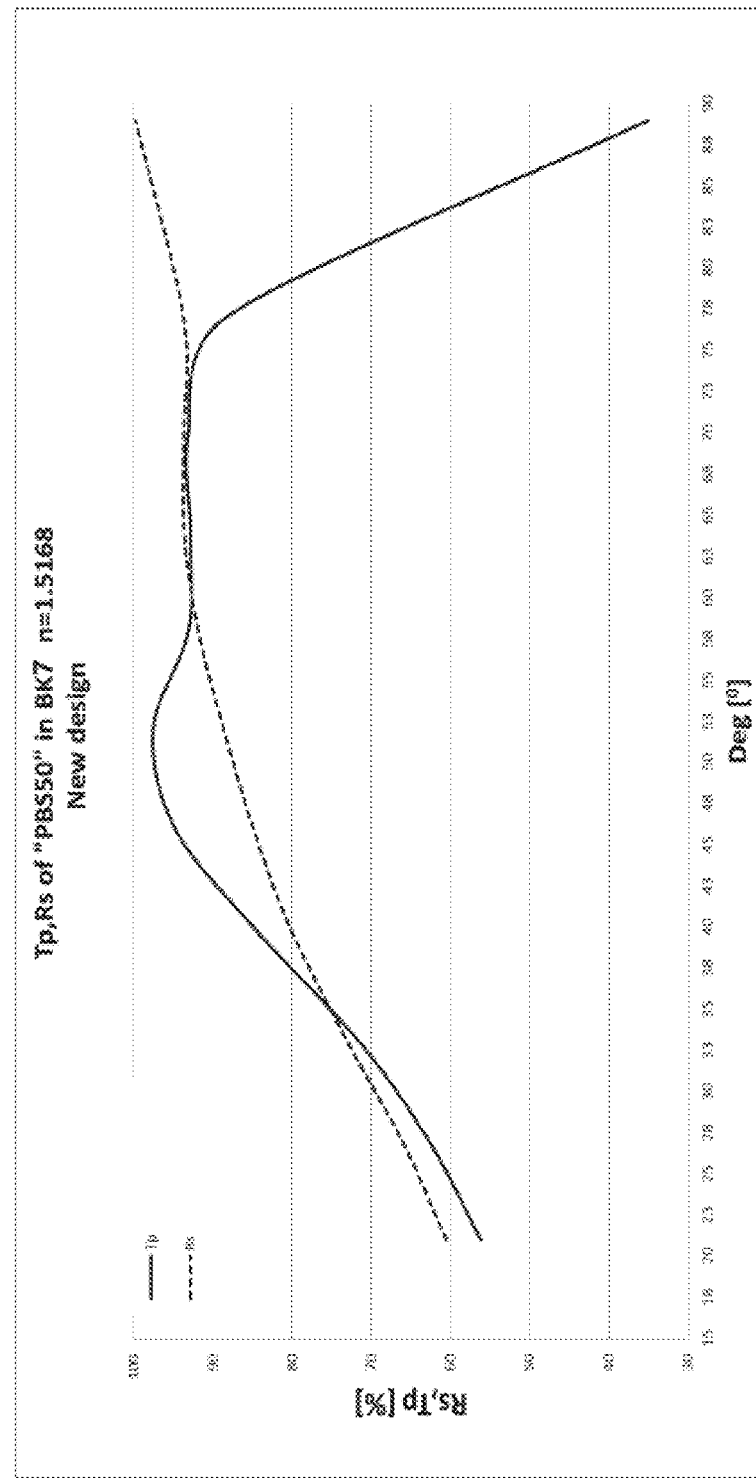
FIG. 4 is a graph illustrating transmissivity to p-polarization and reflectivity to s-polarization as a function of angle of incidence for a polarizing beam splitter suitable for use in an embodiment of the present invention.

FIG. 4 presents a plot of reflectivity and transmissivity of s and p polarizations (respectively) as a function of incident angle, describing a typical coating layer for surface 51, as is known in the field of polarizing beam splitters. Alternatively, a suitable effect may be achieved using a wire grid polarizer. Preferably, the retarder 52 would be a quarter waveplate, such that the polarization of light transmitted by the retarder back and forth would rotate, and would be converted from p-polarized to s-polarized light (or vice versa). As a result of this structure, rays projected by projector 100 are transmitted by beam splitter 51 and pass into the waveguide. Rays that impinge on 52 change their polarization, and are reflected by beam splitter 51 if they impinge on the beam splitter a second time, as illustrated in FIG. 3C. The selective properties of the beam splitter allow a much greater proportion of the injected image illumination to be coupled into the waveguide, with greatly reduced loss of energy. Additionally, the required size of the projector aperture is significantly smaller than in FIGS. 2A and 2B.

The retarder 52 could be implemented in many ways, including but not limited to crystalline zero-order crystalline retarders, thin film polycrystalline true-zero-order retarders, subwavelength structures and advanced dielectric layers coated directly onto the waveguide.

Optimally, the system is implemented so that rays of all fields are reflected from surface 51 only once before reaching the end of the coupling prism. Otherwise, some loss of light will typically occur.

In this embodiment, the steeper-propagating rays (FIG. 3C) may in some cases suffer from a non-uniform intensity profile. This may be mitigated in different ways, for instance, by using an embedded mixer element (namely, a partially reflected surface parallel to the major axes of the waveguide, described below with reference to FIGS. 8A and 8B), or by placing closely-spaced coupling-out facets in the waveguide. The non-uniformity may be reduced or even eliminated by careful design of the projector aperture and geometry of the coupling configuration.

Retarder 52 may be deployed only in the coupling-in region, or may extend over part or all of the waveguide. The retarder may also serve to rotate and mix the polarization along the waveguide, and mitigate any polarization artifacts that may arise, for instance, by the polarization-dependent coupling-in configuration of this embodiment. The retarder could be located on the external surface of the waveguide, or between the waveguide 10 and external thin cover-plates (not shown), which may be used to enhance uniformity of out-coupled illumination.

In this and other embodiments described herein, trapping of light within the LOE by beam splitter 51 relatively close to the image injection surface provides advantages for design of image projector 100. Specifically, for optical efficiency, the entrance aperture of the waveguide is preferably imaged by the projector optics (illumination optics plus collimating optics, not shown) to the illuminations stop of the projector. In the design for FIGS. 2A and 2B, the effective aperture to the waveguide is at the end of the coupling prism, far from the image injection surface. In contrast, the design of FIGS. 3A-3C and the subsequent examples herein provide an effective waveguide aperture that is much closer to the image injection surface 32, allowing the use of a generic projector design in which the illumination stop is imaged to the projector exit aperture and typically facilitating the use of a smaller overall size of the projector.

FIGS. 5A and 5B show an alternative implementation of an embodiment of the invention where the image injection surface 32 is provided entirely by coupling prism 30, resulting in projector 100 being placed on top of the waveguide. Such a configuration would be significantly easier to manufacture, but results in a slightly larger aperture. In all other respects, the structure and operation of the implementation of FIGS. 5A and 5B are analogous to those of FIGS. 3A-3C.

FIGS. 6A and 6B illustrate an alternative implementation which, instead of employing a retarder on the second major surface of the waveguide, employs a retarder 52 in the form of a half-wave plate deployed in overlapping relation to a first part of the aperture 101 without overlapping a second part of the aperture. In the case illustrated here, the "first" part of the aperture projects illumination through a part of the image injection surface 32 from which light passes through beam splitter 51. This is suited to a case in which the projector projects a polarization which is reflected by the beam splitter. The polarization which is reflected by the beam splitter is introduced directly into the LOE in the lower part of the coupling-in surface, as shown, and is therefore trapped by the beam splitter and propagates by internal reflection along the LOE, while the half-wave plate 52 converts the illumination of the second polarization into illumination of the first polarization in the upper part of the aperture as shown, allowing that part of the image illumination to be transmitted by the beam splitter and to enter the LOE.

Thus, by way of a specific example, in the case of FIGS. 6A and 6B where the beam splitter passes p-polarization and reflects s-polarization, the rays of the lower part of the image injection surface that are injected directly into the waveguide and that do not propagate through the retarder 51 are s-polarized, while the rays of the upper part of the image injection surface, that do propagate through the retarder 51, (which here preferably acts as a half waveplate) are injected into the waveguide at p-polarization.

Clearly, an equivalent effect can be achieved by using a projector which generates the polarization that is transmitted by the beam splitter, and deploying the half-wave plate 52 on the part of the image injection surface 32 through which light is coupled directly into the LOE without traversing the beam splitter (the lower part, in the orientation illustrated here).

In all of the embodiments described herein, the beam splitter is described as being at an interface between the first major external surface 11 and the coupling prism 30, and parallel to the major external surfaces. The "interface" for this purpose is defined functionally as the region in which light passes from coupling prism 30 into LOE 10. Most preferably, the beam splitter is deployed coplanar with the first major external surface 11, typically either as a coating applied to one or other of the facing surfaces of coupling prism 30 into LOE 10 prior to bonding, or as a film or other layer sandwiched between the coupling prism 30 and LOE 10. However, deployment of the beam splitter embedded within coupling prism 30 or within LOE 10 would also be considered to be "at the interface" so long as it is sufficiently close to the interface to provide the functionality described above. In all of the illustrated cases, parallelism of the beam splitter to the major surfaces of the LOE is essential in order to avoid generating ghost images as the image illumination propagates along the LOE.

The various coupling-in arrangements described above inherently couple light into the waveguide in a mixed polarization state, i.e., with a superposition of p and s polarized light, such that for a certain field some regions of the input aperture are composed of p-polarized light and other regions of the input aperture are composed of s-polarized light. Since the embedded (refractive or diffractive) components that couple light out of the waveguide are typically polarization sensitive, this could potentially result in striped (non-uniform intensity) images at the output.

In principle, the embedded elements could be designed and optimized to maximize uniformity by matching the conditions of both polarization states, but this is usually very difficult to achieve; and would come at the price of efficiency, color uniformity etc. Therefore, a number of alternative approaches are proposed below to mitigate effects of the mixed-polarization illumination coupled into the waveguide. Certain examples employ a non-uniformity mitigating element, such as a retarder or depolarizer 201 (FIGS. 7A-7C) or a partially-reflecting mixing element 202 (FIGS. 8A-8B), to decrease a non-uniformity in the light redirected towards the viewer caused by the spatial non-uniformity of polarization, all as described further below.

As presented in FIGS. 7A-7C, a polarization retarder 201 can be placed inside the waveguide so that it controls the polarization state of the light inside the waveguide. The retarder can be made from a birefringent crystal, from a thin layer of polymer or from a structural or spatially varying coating or spatially varying grating. Such an element can be embedded inside the waveguide (as described in coassigned PCT patent application no. PCT/IL2021/051143), or it can be bonded separately between the waveguide and the coupling-in wedge, if these are produced separately. The thickness of the retarder can be set to a preferred thickness. For instance, it can be thin, such that it would operate as a true quarter waveplate for the relevant wavelengths and considering the angle of incidence of all fields in the field of view (FOV), such that s and p polarized light transmitted by the retarder would be converted to (approximately) circularly polarized (but with opposite handedness).

In an alternative but conceptually-related implementation, the projector 100 may be configured to generate circularly polarized image illumination, and the polarized beam splitter 51 can correspondingly be implemented as a circular-polarized beam splitter. In this manner, light coupled into the waveguide would be either right or left-handed circularly polarized, and the uniformity of the output light would be significantly improved.

Alternatively, the retarder can be made "thick", defined by $$d > \frac{\Delta\lambda}{\Delta n},$$

where d is the thickness of the retarder, $\Delta\lambda$ is the spectral bandwidth of each transmitted color and $\Delta n=|n_e-n_o|$ where $n_e$ and $n_o$ are the extraordinary and ordinary refractive indices of the retarder. Typically, d~0.1-1 mm is sufficient for the retarder to provide a "depolarizing" effect. Specifically, different wavelengths within a given color spectral bandwidth are rotated to different polarization states, and the superposition of all wavelengths behaves effectively as unpolarized light. This element may therefore be referred to as a "birefringent depolarizing element."

A thick retarder may cause unwanted artifacts in the configurations of FIGS. 7B and 7C, due to the different optical paths through the retarder that would generate ghost images. This can be resolved if the retarder is placed perpendicular to the waveguide with sufficient accuracy, as in FIG. 7A. In this case, the angular orientation of all rays propagating through the retarder is maintained, and no ghost images are expected.

If the projector outputs image illumination in a polarization state that is not orthogonal to the waveguide, i.e., not pure s or p polarized light according to the waveguide axes, but rather a linear superposition of the two, the polarization of each wavelength would rotate at each reflection of TIR on the major surfaces of the waveguide. This would effectively have a similar effect to the thick retarder in FIG. 7. This mixing of the coating could be further enhanced by coating the major surfaces of the waveguide with a dedicated coating, as in patent WO2021105978A1.

Another approach could be to place a partially reflective layer 202 in the middle of the waveguide and parallel to the major external surfaces (as disclosed in PCT patent application publication no. WO 2021/079372), that would mix the light. Examples of such a structure are illustrated in FIGS. 8A and 8B. According to this option, the light of each field would be uniform throughout the waveguide, however the proportion of p and s polarized light might still vary from one field to another. This effect would need to be accounted for when designing the properties of the diffractive or refractive elements that are embedded inside the waveguide.

The various implementations of the present invention described here are applicable in a wide range of contexts, and employing any type of waveguide and any type of projector. For example, projectors 100 may employ any suitable image-generating technology including, but not limited to, liquid crystal transmissive or reflective (LCOS) projectors, scanned-laser projectors or DLP projectors, all employing any suitable collimating optics.

It will be appreciated that the above descriptions are intended only to serve as examples, and that many other embodiments are possible within the scope of the present invention as defined in the appended claims.

What is claimed is:

1. An optical system comprising:
   (a) a light-guide optical element (LOE) formed from transparent material and having mutually-parallel first and second major external surfaces for guiding light by internal reflection;
   (b) a projector configured to project light corresponding to a collimated image from an aperture, the light exiting said aperture with a chief ray defining an optical axis of said projector and with an angular field about the chief ray;
   (c) a coupling-in arrangement associated with said projector and with said LOE for coupling said light from said projector into said LOE at a coupling-in region so that the light undergoes internal reflection at said major external surfaces, said coupling-in arrangement including a reflective polarizing beam splitter and a waveplate deployed such that, for at least one part of said angular field, the light propagating within said LOE has spatial non-uniformity of polarization;
   (d) a coupling-out arrangement associated with said LOE for redirecting the light propagating within said LOE towards a viewer, said coupling-out arrangement being polarization-sensitive; and
   (e) a non-uniformity mitigating element selected from the group consisting of: a retarder; a birefringent depolarizing element; and a partially-reflecting mixing element, said non-uniformity mitigating element being associated with said LOE and deployed to interact with the light propagating within said LOE between said coupling-in arrangement and said coupling-out arrangement to as to decrease a non-uniformity in the light redirected towards the viewer caused by said spatial non-uniformity of polarization.

2. The optical system of claim 1, wherein said non-uniformity mitigating element comprises a retarder associated with said LOE and deployed to convert linear polarization of the light propagating within said LOE to circular polarization.

3. The optical system of claim 1, wherein said non-uniformity mitigating element comprises a block of birefringent material having a thickness d greater than $\Delta\lambda/\Delta n$, where $\Delta\lambda$ is the spectral bandwidth of the light and $\Delta n=$ is the difference between the extraordinary and the ordinary refractive indices of the birefringent material, so as to achieve depolarization.

4. The optical system of claim 1, wherein said non-uniformity mitigating element is a flat element deployed substantially perpendicular to said major external surfaces of said LOE.

5. The optical system of claim 1, wherein said non-uniformity mitigating element is a flat element located at one of said major external surfaces of said LOE.

6. The optical system of claim 1, wherein said non-uniformity mitigating element is a flat element deployed within said LOE in a plane oblique to said major external surfaces of said LOE.

7. The optical system of claim 1, wherein said non-uniformity mitigating element is at least one partially-reflecting surface deployed within said LOE, parallel to said first and second major external surfaces.

8. The optical system of claim 7, wherein said partially-reflecting surface is deployed in the middle of a thickness of said LOE.

9. The optical system of claim 7, wherein said at least one partially-reflecting surface is implemented as two partially-reflecting surfaces deployed so at to subdivide a thickness of said LOE into three portions.

* * * * *